United States Patent [19]
Vaillancourt et al.

[11] Patent Number: 5,470,103
[45] Date of Patent: Nov. 28, 1995

[54] MOTOR VEHICLE HEAD IMPACT AIR BAG SYSTEM

[75] Inventors: Glenn M. Vaillancourt, Saco, Me.; Lee E. Gridley, Ossipee, N.H.

[73] Assignee: Davidson Textron Inc., Dover, N.H.

[21] Appl. No.: 364,638

[22] Filed: Dec. 27, 1994

[51] Int. Cl.⁶ .................................................. B60R 21/08
[52] U.S. Cl. .................................. 280/730.1; 280/730.2
[58] Field of Search ........................ 280/730.1, 730.2, 280/732

[56] References Cited

U.S. PATENT DOCUMENTS

| | | | |
|---|---|---|---|
| 2,834,606 | 5/1958 | Bertrand | 280/730.1 |
| 3,603,535 | 9/1971 | DePolo | 280/730.1 |
| 3,795,412 | 5/1974 | John | 280/730.1 |
| 3,897,961 | 8/1975 | Leising et al. | 280/730.1 |
| 3,981,518 | 9/1976 | Pulling | 280/730.2 |
| 4,536,008 | 8/1985 | Brown, Jr. | 280/730.1 |
| 5,251,931 | 10/1993 | Semchena et al. | 280/730.2 |

FOREIGN PATENT DOCUMENTS

| | | | |
|---|---|---|---|
| 2667831 | 10/1990 | France | B60R 21/22 |
| 2041741 | 2/1972 | Germany | 63 C 70 |

*Primary Examiner*—Kenneth R. Rice
*Attorney, Agent, or Firm*—Reising, Ethington, Barnard & Perry

[57] ABSTRACT

A motor vehicle is provided with an air bag system having a singular air bag that deploys downward from the ceiling to cushion the front and both sides of both the driver and a front seat passenger from over their head and to at least their shoulders to prevent their impacting with upper interior portions of the vehicle and with each other in a collision. The air bag includes an elongated front section that extends transverse of the vehicle along the front of the seats, elongated side sections that extend rearwardly from the front section along the outer side of the respective seats, and an elongated intermediate section that extends rearwardly from the front section between the seats.

9 Claims, 3 Drawing Sheets

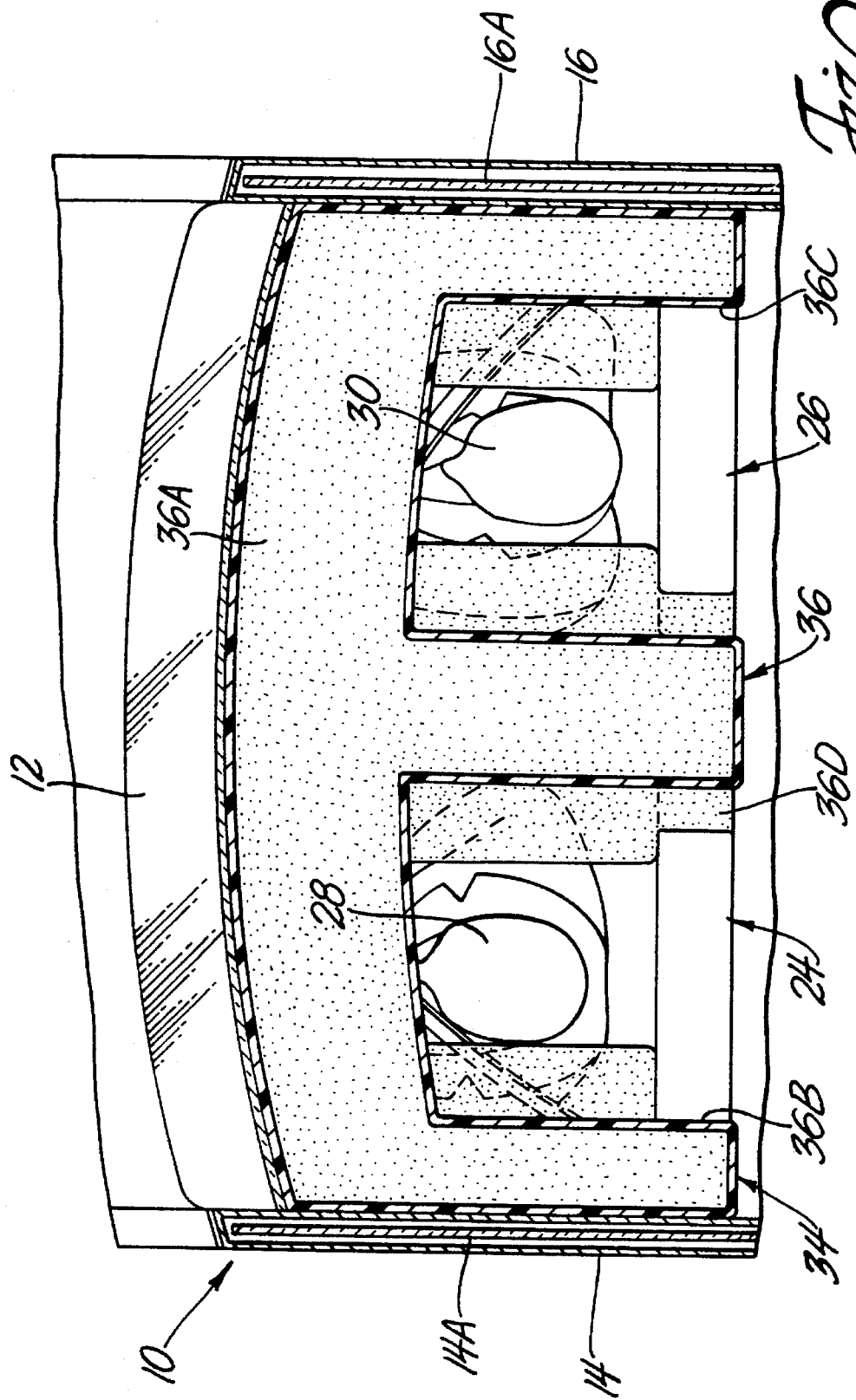

MOTOR VEHICLE HEAD IMPACT AIR BAG SYSTEM

TECHNICAL FIELD

This invention relates to motor vehicle air bag systems and more particularly to those for protecting an occupant against head injury in a frontal, side and rear collision.

BACKGROUND OF THE INVENTION

Motor vehicle occupants are presently protected against injury in a collision by seat belts, energy management materials and air bag systems. The air bag systems that are currently available typically have a driver-side air bag that is deployed from the steering wheel and a separate passenger-side air bag that is deployed from the instrument panel. These dual air bags are capable of providing good protection against injury from the instrument panel, steering wheel and windshield in front and rear collisions but are restricted because of their deployment location in protecting against head injury on side impacts and against head injury by upper portions of the vehicle structure in front, side and rear collisions. Protection with respect to the head of the occupant and more particularly with respect to those from side impacts has proved to be a problem in that the necessary air bag deployment must occur in the limited space between the head of the occupant and the adjacent interior vehicle side structure and door including side window. Various proposals have been made to protect against injury on side impacts such as by providing air bags that deploy from the doors as disclosed in U.S. Pat. No. 3,981,518, that deploy from the seats as disclosed in U.S. Pat. No. 5,251,931 and French Patent No. 2,667,831, and that deploy from the ceiling and side pillars as disclosed in U.S. Pat. No. 3,897,961 and German Offenlegungsschrift No. 2,041,741. It has also been proposed to deploy an air bag arrangement from the ceiling of the passenger compartment that completely surrounds an individual occupant including the seat as disclosed in U.S. Pat. No. 3,795,412.

In the above air bag systems, those that use only one air bag to provide protection in both front and side impacts employ a relatively complicated air bag construction that is quite costly compared to the presently used driver-side and passenger-side air bags that deploy directly toward the front of the driver and passenger. And those that require separate air bags for protecting against both front and side impact are also quite costly in comparison. Motor vehicle air bag systems are generally an option for the buyer and there is a substantial on going effort by the automobile manufacturers and others to add side impact protection and enhanced head protection in an air bag system without dramatically adding to the cost of the present systems.

SUMMARY OF THE INVENTION

The present invention offers a very effective, low cost solution in the use of only one air bag to protect side-by-side occupants, such as the driver and a front seat passenger, against direct injury to their head in frontal, rear and side collisions. Moreover, the single air bag of the present invention also prevents the two occupants from impacting with each other in a side impact collision. This is accomplished by deploying the air bag from the ceiling of the vehicle and structuring it with an enveloping configuration that protects the head of both the driver and front seat passenger from impacting with the upper interior portions of the vehicle and from impacting with each other. The air bag is structured with an elongated front section that extends transversely of the vehicle at an overhead position at the front of the seats and three elongated parallel branch sections that extend rearwardly from the front section at overhead positions along the opposite sides of both of the seats.

The two outer most branch sections extend overhead along the outer side of the respective seats and the intermediate branch section extends overhead between the seats. At least one gas generator is connected to the singular air bag at its front section and the air bag on deployment surrounds the front and both sides of each of the occupants from their head to at least their shoulders to prevent their contact with the upper interior portions of the vehicle and with each other. Where the vehicle has rear seats, a similar low cost air bag may added to the ceiling in the rear of the passenger compartment to protect rear seat occupants.

The elongated sections of the air bag are configured cross-wise so as to be expandable to fill the different size spaces at the front and sides of the occupants from the ceiling down to at least about the level of the shoulders of the occupants. As a result, the normally open space in the ceiling area at the front and both sides of the heads of the occupants is completely filled by the single air bag on deployment from the ceiling downward to separately cushion the heads of the occupants from impacting with the upper interior portions of the passenger compartment and with each other. In the case of a frontal or rear collision, the front section of the air bag provides the primary cushioning protection. In the case of side collisions, the outer branch sections of the air bag provide the primary cushioning protection between the respective occupants and side portions of the vehicle interior while the center or intermediate air bag section provides excellent cushioning protection directly between the heads of the occupants to prevent their impacting with each other. Furthermore, the heads of the occupants are protected in a downwardly progressive manner on deployment of the air bag so that priority is thus given thereto as compared to their upper torso from the shoulder down which can be restrained by seat belts in a conventional manner.

The air bag is hidden in the ceiling behind panels in a vinyl cover which are opened by the inflation of the air bag to allow its downward deployment. The panels are coextensive with the respective sections of the air bag and are each defined by a tear seam and a living hinge formed in the vinyl cover. The tear seams of the panels are adapted to tear from the force of the inflating air bag and the panels then swing downward about their living hinge to cooperatively create an opening in the cover for the deployment of the air bag.

It is therefore an object of the present invention to provide a new and improved motor vehicle head impact air bag system providing both front and side cushioning protection.

Another object is to provide a motor vehicle head impact air bag system employing a single multisection bag that is deployed from the ceiling of the vehicle and cushions the front and both sides of adjacent occupants from their head to their shoulders to protect them from impacting with the interior of the vehicle and with each other in a collision.

Another object is to provide a motor vehicle head impact air bag system employing a single multisection bag that is deployed from the ceiling of the vehicle from behind cover panels each with a living hinge and tear seam at each section of air bag and cushions the front and both sides of adjacent occupants from their head to their shoulders to protect them from impacting with the interior of the vehicle and with each other in a collision.

Another object is to provide a motor vehicle air bag system employing a single multisection bag that is deployed from the ceiling of the vehicle and has an elongated section extending transversely of the driver and a passenger and three elongated sections extending rearwardly therefrom along side these occupants that cooperatively provide front and side surrounding cushioning protection for these occupants from their head to their shoulders in a downwardly directed manner to protect them against injury in frontal, rear and side collisions.

These and other objects, advantages and features of the present invention will become more apparent from the following description and accompanying drawings wherein:

BRIEF DESCRIPTION OF THE DRAWINGS

FIG. 6 is a view taken along the line 6—6 in FIG. 2 when looking in the direction of the arrows.

DETAILED DESCRIPTION OF THE DRAWINGS

Figure 1:
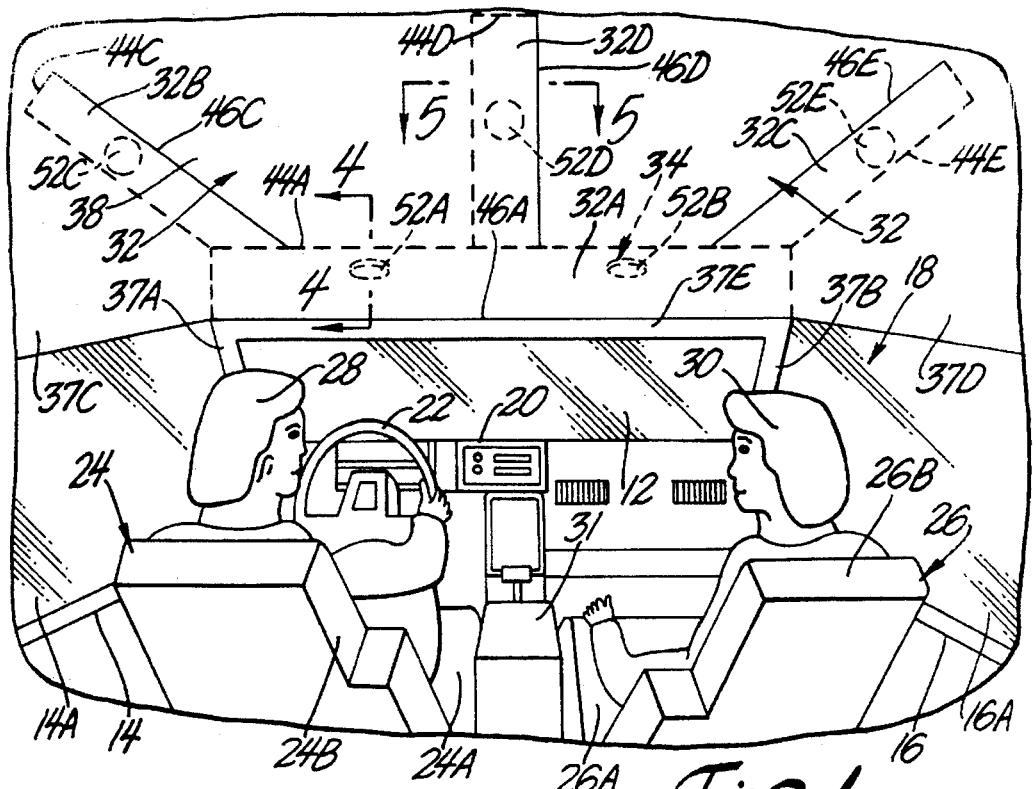
FIG. 1 is a diagrammatic view of a motor vehicle having an air bag system according to the present invention wherein the system is illustrated in its stored condition.

Referring to FIG. 1, there is illustrated a motor vehicle 10 having a windshield 12, a left-side door 14, a right-side door 16, and a passenger compartment 18. Located in the passenger compartment 18 are an instrument panel 20, a steering wheel 22, and a pair of front seats 24 and 26 for a driver 28 and a passenger 30, respectively. The seats may be bucket seats with a console 31 therebetween as illustrated or a bench seat arrangement. The passenger compartment further includes a ceiling or headliner 32 behind which is mounted an air bag system 34 according to the present invention.

The air bag system 34 comprises a singular inflatable multisection air bag 36 for simultaneously protecting both the driver and the front seat passenger from impacting with interior portions of the vehicle in front, side and rear impacts. Those portions of the passenger compartment which present potential harm to the head of the driver and/or passenger include the windshield 12, the instrument panel 20, the steering wheel 22, the doors 14 and 16 including their window 14A and 16A respectively, and the trimmed interior of the body structure 37 including the roof pillars 37A and 37B, the side rails 37C and 37D and the transverse front rail 37E at the upper edge of the windshield. The multisection air bag 36 is also adapted to prevent these occupants from impacting with each other in a side impact.

Figure 4:
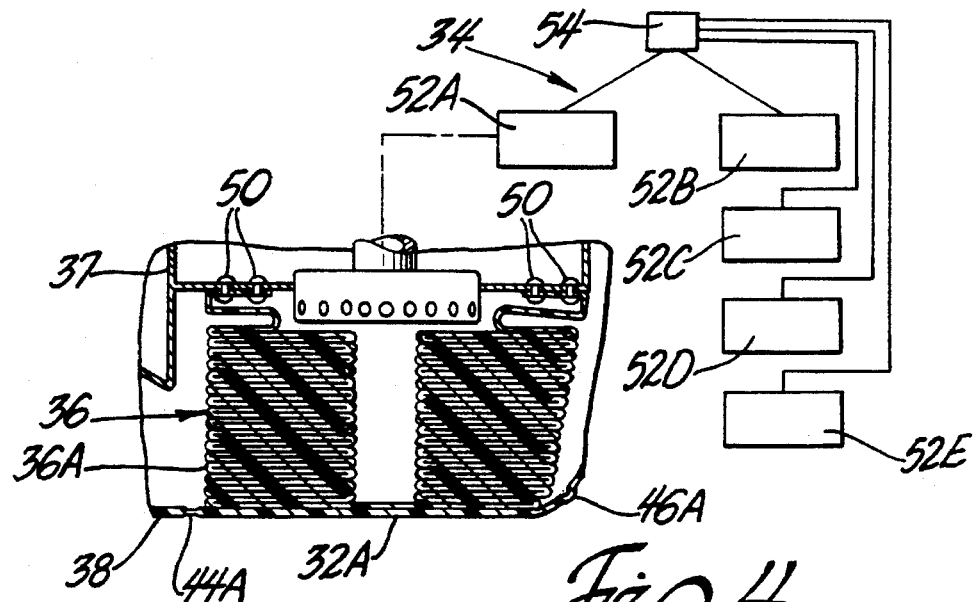
FIG. 4 is an enlarged view taken along the line 4—4 in FIG. 1 when looking in the direction of the arrows.
Figure 5:
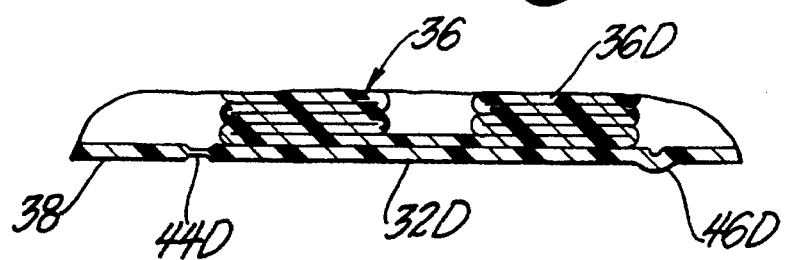
FIG. 5 is an enlarged view taken along the line 5—5 in FIG. 1 when looking in the direction of the arrows.

The multisection air bag 36 has a generally E-shaped configuration as viewed from over head or in plan view and comprises four elongated integral sections; namely, a transverse front section 36A that extends transverse of the vehicle and three parallel branch sections 36B, 36C and 36D of equal length that extend rearwardly from the front section 36A longitudinally of the vehicle. As illustrated in FIGS. 4 and 5, the air bag 36 in its deflated state assumes an accordion shape to allow its compact storage in an overhead space above the ceiling 32 where it is hidden from view by four hinged ceiling panels 32A, 32B, 32C and 32D of rectangular shape that cover the respective air bag sections 36A, 36B, 36C and 36D.

The ceiling 32 includes a self-supporting vinyl cover 38 that is attached to the underside of the vehicle roof structure 37F by suitable conventional attaching means (not shown). The panels 32A, 32B, 32C and 32D hiding the air bag 36 are integrally formed in the cover 38. These panels are all of similar construction whose details will be described with reference to the front panel 32A and the center panel 33D as illustrated in FIGS. 4 and 5, respectively.

Figure 2:
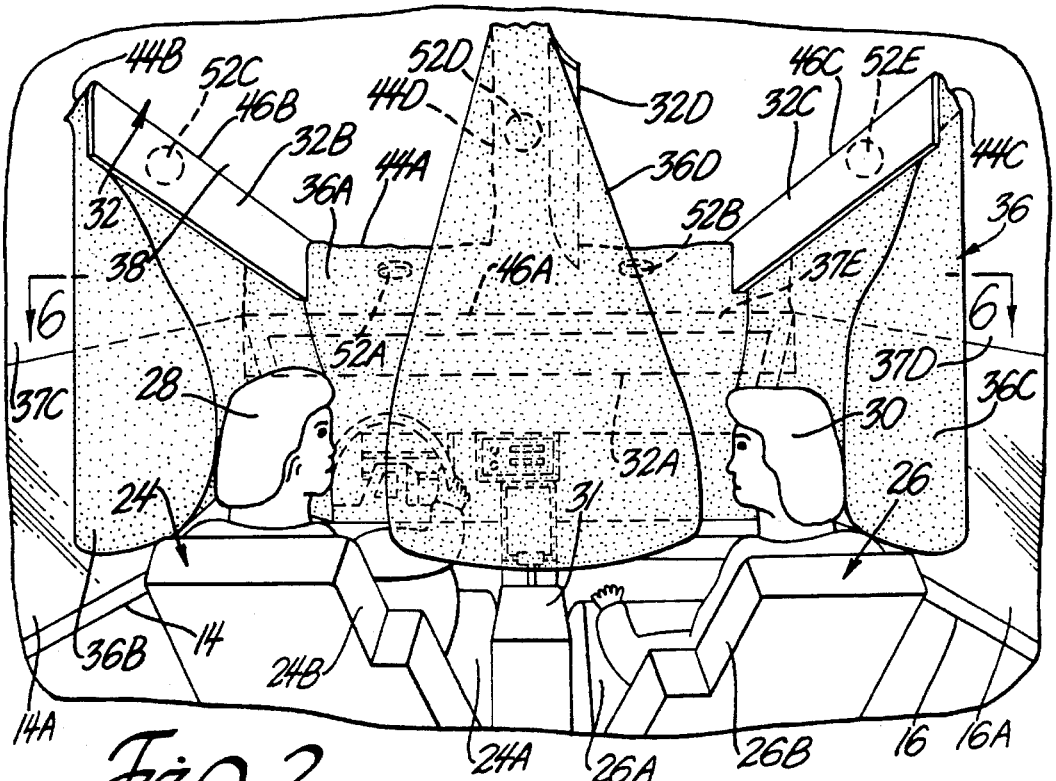
FIG. 2 is a view similar to FIG. 1 but illustrating the singular air bag deployed.
Figure 3:
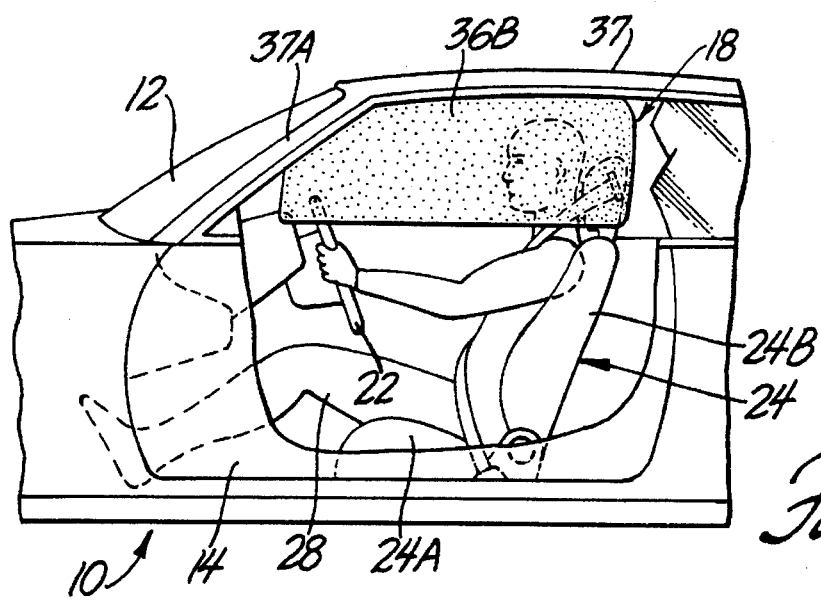
FIG. 3 is side view of the driver side of the vehicle in FIG. 2 with a part of the door and side window broken away.

Referring to FIG. 4, the panel 32A is defined by a tear seam 44A formed in the vinyl cover 38 and by a living hinge 46A that is also formed in the vinyl cover. The tear seam 44A extends along three edges of the panel and the living hinge 46A extends along the fourth edge which is one of the two long edges and they together normally hold the respective air bag section in place in its stored or uninflated condition hidden from view. The tear seam 44A is formed with substantially less thickness than the remainder of the cover so as to provide a weakened section in the cover that is torn by the force of the air bag on its inflation at the respective air bag section 36A as illustrated in FIG. 2. The panel 32A then swings downward about its living hinge 46A to create a rectangular shaped opening in the ceiling cover 38 through which the respective elongated section 36A of the air bag can pass as it inflates. The ceiling panel 32D is of similar construction as illustrated in FIG. 5 with a tear seam 44D and living hinge 46D and operates in the same manner to allow the deployment of the air bag section 36D. The other ceiling panels 32B and 32C have similar tear seams 44B and 44C and living hinges 46B and 46C, respectively, and operate in a similar manner to allow deployment of the air bag sections 36B and 36C, respectively. The front short edge of the panels 32B, 32C and 32D abuts with the long rear edge of the front panel 32A as illustrated in FIG. 1 and on air bag deployment as illustrated in FIG. 2 the panels open downward to cooperatively create a E-shaped opening in the cover conforming to the configuration of the air bag 36 to freely allow its deployment vertically downward into the passenger compartment and about both the driver and passenger as illustrated in FIGS. 2, 3 and 6.

The air bag 36 is attached at its upper side along the length thereof of each of its sections 36A, 36B, 36C and 36D to the underside of the vehicle roof structure 37F with fasteners 50 as illustrated in FIG. 4. The air bag 36 is inflated with at least a pair of gas generators 52A and 52B that are directly connected to its front section 36A at locations between the respective branch sections. It is preferred, however, to have additional gas generators 52C, 52D and 52E that are directly connected to the other air bag sections 36B, 36D and 36C, respectively. The gas generators 52A, 52B, 52C, 52D and 52E are all similar and of a suitable conventional type and are simultaneously operated by an impact sensor 54 that is also of a suitable conventional type. The sensor 54 is operable to sense when the vehicle has incurred a collision at the front, rear and/or side of the vehicle and immediately operates the gas generators to inflate the air bag 36 causing it to expand along its length in a vertically downward direction from the ceiling into the passenger compartment.

The air bag 36 is configured and arranged in its stored condition so that the front section 36A extends overhead along the front of the seat bottoms 24A and 26A between points adjacent the doors 14 and 16, the outer branch sections 36B and 36C extend overhead along the outer side of the respective seat bottoms 24A and 26A between points adjacent the edges of the respective doors 14 and 16, and the center branch section 36D extends overhead between the two seat bottoms 24A and 26A from the front of the seat bottoms to the respective seat backs 24B and 26B. The air bag is configured in cross-section so that in its inflated state or condition, all of its sections extend downward to past the heads of the occupants to at least about the level of their shoulders thereby surrounding the occupant in each seat from their head to their shoulders with an air bag cushion arrangement that essentially fills the space about the occupants between their heads and between their heads and the adjacent upper interior portions of the passenger compartment as illustrated in FIGS. 2, 3 and 6. The shoulders of the average person will be at about the level of the top of the seats 24 and 26 (i.e. the top of the seat backs 24B and 26B) and this is the level to which the multisection air bag 36 is preferably configured to extend downward to as illustrated in FIGS. 2 and 3. The air bag may also be configured to extend further downward to about the level of the seat bottoms to engage the thighs of the occupants but the shoulder level is preferred to minimize the size of the air bag and thereby the inflation pressure that is necessary.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, the air bag system has been illustrated for use in protecting the driver and a front seat passenger. Where the vehicle has a rear seat, a similar air bag system could likewise be added in the ceiling in the rear of the passenger compartment to similarly protect the rear seat passengers. It is therefore to be understood that within the scope of the appended claims, the invention may be practiced otherwise than as specifically shown and described.

What is claimed is:

1. An air bag system for a motor vehicle having a pair of adjacent seats and a ceiling located above said seats, said seats have a bottom and a back, said air bag system including a singular inflatable multisection air bag mounted in said ceiling for deployment vertically downward in a front and side and in between manner with respect to said seats, said air bag configured in an E-shape as viewed from overhead and in cross-section so as to form on inflation a singular air bag cushion that extends downward to at least about the level of the top of said seat backs along a front side of both of said seats and along an outer side of both of said seats and along an inner side of both said seats.

2. An air bag system as set forth in claim 1 wherein said air bag on inflation extends downward to about the level of said seat bottoms.

3. An air bag system as set forth in claim 1 wherein said air bag comprises an elongated front section that extends transversely of the motor vehicle along said front side of both said seats, elongated outer branch sections that extend rearwardly from said front section along said outer side of the respective said seats, and an elongated center branch section that extends rearwardly from said front section between said outer branch sections and along said inner side of both said seats.

4. An air bag system as set forth in claim 3 wherein at least one gas generator is directly connected to each said section of said air bag.

5. An air bag system as set forth in claim 3 wherein a pair of gas generators are directly connected to said front section, said gas generators being connected to said front section at a location between said center branch section and the respective outer branch sections.

6. An air bag system as set forth in claim 3 wherein said sections of said air bag are attached at an upper side along the length thereof to an interior side of a roof portion of the vehicle.

7. An air bag system as set forth in claim 5 wherein gas generators are directly connected to said center and outer branch sections respectively.

8. An air bag system as set forth in claim 3 wherein said air bag is concealed in said ceiling behind a cover, said cover having an integral panel coextensive with each said section of said air bag, each said panel defined by a living hinge and a tear seam formed in said cover, said tear seams adapted to tear by the force of said air bag on inflation acting at the respective said sections of said air bag on the respective said panels, said panels adapted to swing downward about their said living hinge on tearing of their said tear seam to form openings in said cover for deployment of the respective said sections of said air bag.

9. An air bag system as set forth in claim 8 wherein said openings have a rectangular shape and cooperatively define an E-shape opening in said cover for deployment of said air bag.

* * * * *